Nov. 3, 1925.

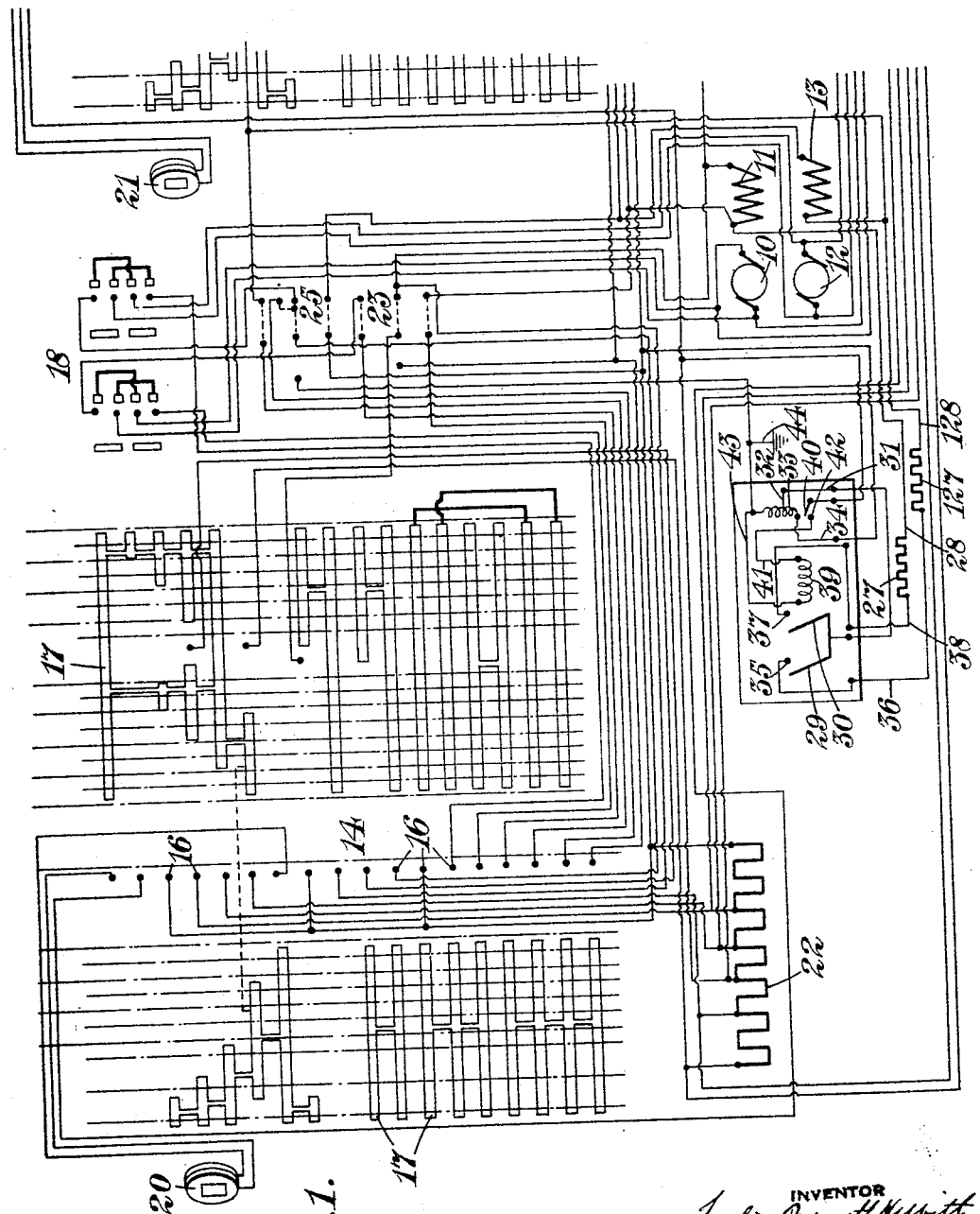

L. B. HEWITT 1,559,700

ELECTRICAL CURRENT OPERATED CONTROLLING MECHANISM

Filed Aug. 22, 1923 6 Sheets-Sheet 2

INVENTOR
Leslie Burnett Hewitt
By Byrnes, Stebbins & Parmelee
His Attys

Nov. 3, 1925.
L. B. HEWITT
1,559,700
ELECTRICAL CURRENT OPERATED CONTROLLING MECHANISM
Filed Aug. 22, 1923      6 Sheets-Sheet 3
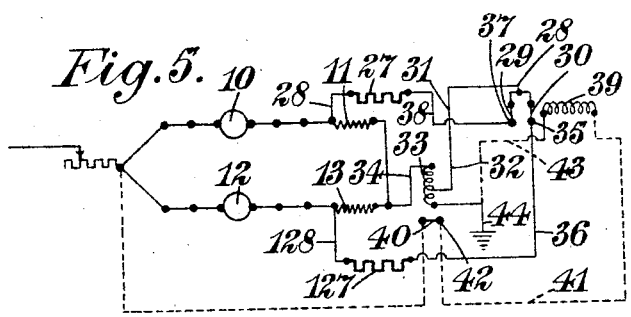
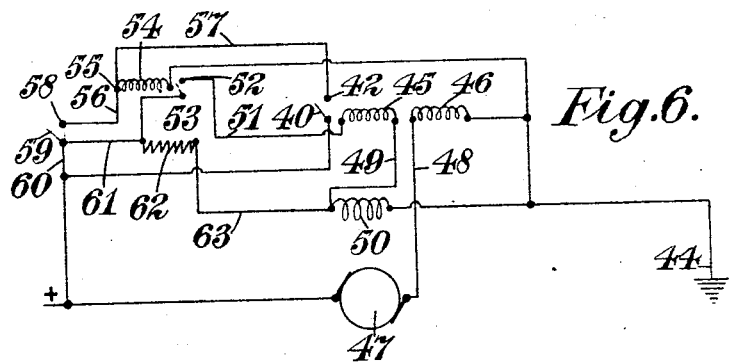
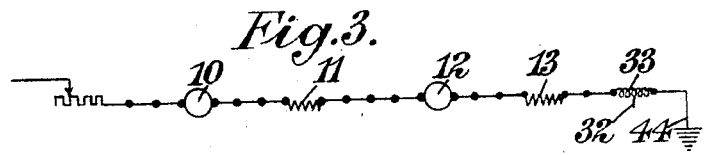
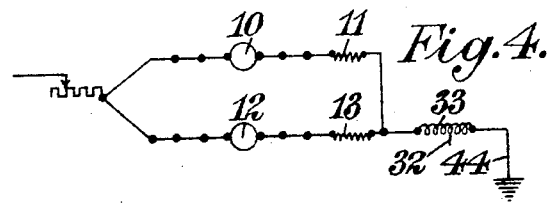

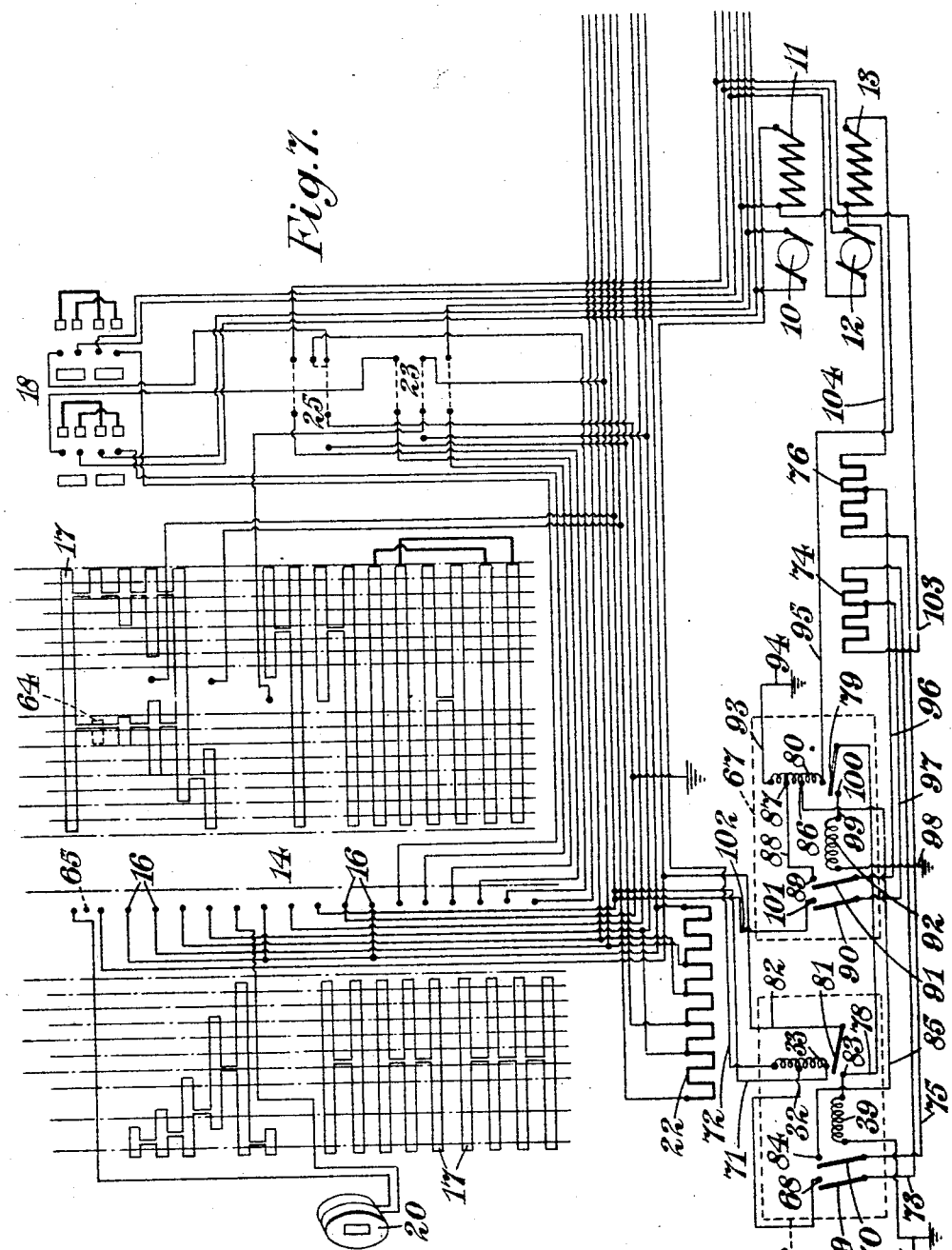

Nov. 3, 1925.
L. B. HEWITT
1,559,700
ELECTRICAL CURRENT OPERATED CONTROLLING MECHANISM
Filed Aug. 22, 1923
6 Sheets-Sheet 5

Nov. 3, 1925.  L. B. HEWITT  1,559,700
ELECTRICAL CURRENT OPERATED CONTROLLING MECHANISM
Filed Aug. 22, 1923  6 Sheets-Sheet 6
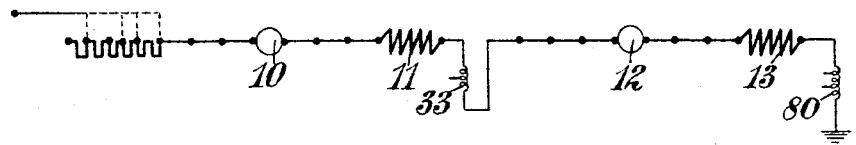
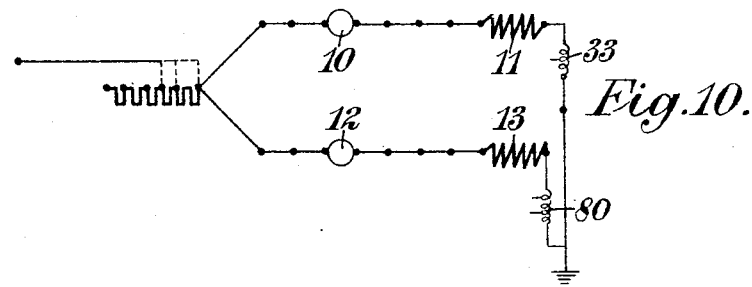
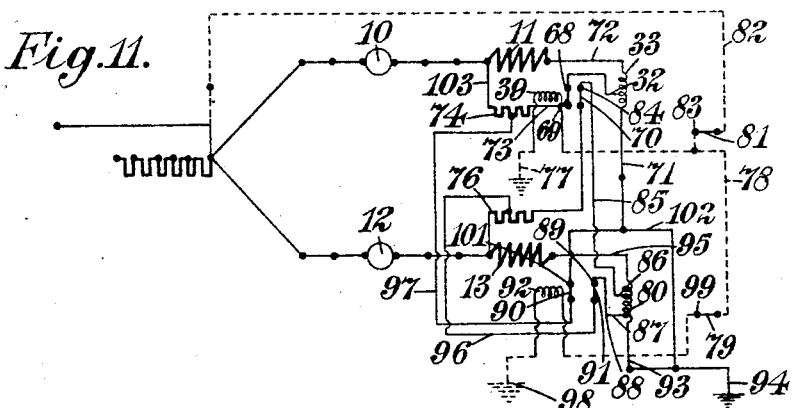
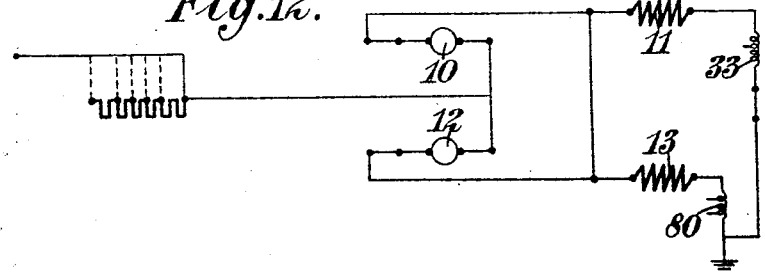

Patented Nov. 3, 1925.

1,559,700

UNITED STATES PATENT OFFICE.

LESLIE BARNETT HEWITT, OF LONDON, ENGLAND.

ELECTRICAL CURRENT-OPERATED CONTROLLING MECHANISM.

Application filed August 22, 1923. Serial No. 658,750.

*To all whom it may concern:*

Be it known that I, LESLIE BARNETT HEWITT, a subject of the King of England, residing at Palmers Green, London, England, have invented certain new and useful Improvements in Electrical Current-Operated Controlling Mechanism, of which the following is a specification.

This invention is for improvements in or relating to electrical current-operated controlling mechanism, and has for one of its objects to provide a mechanism which shall be simple and compact in construction and efficient in operation. Another object of the invention, in so far as it is concerned with electrically driven vehicles, is to provide for increased acceleration and vehicle speed in safe circumstances. A further object of the invention is to improve motor control systems which embody a field-varying means automatically controlled by an over-load switch for the protection of the motor.

According to the present invention there is provided a magnet coil comprising a plurality of parts each with a separate current-supply lead so that currents of differing magnitude, by being passed through different lengths of the coil, can have the same operative effect upon the armature. Conveniently the coil is so connected to the current-supply that it is automatically energized to operate its armature either when—

(a) A current or currents of predetermined magnitude passes through a plurality of the coil parts, or when—

(b) A current of predetermined higher magnitude passes through a smaller number of coil parts.

The energizing of the magnet coil may be done in a number of different ways, but in some circumstances it will be found to be most useful, in so far as condition (b) is concerned, to arrange that the coil shall be energized when a current of lower magnitude passes through a plurality of the coil parts and an additional current passes through a smaller number of coil parts only. In other circumstances a two-part magnet coil may be energized, in so far as condition (a) is concerned, when two different currents pass the one through the one coil part only and the other through the other coil part only, and in so far as condition (b) is concerned when there is no current passing through one coil part.

The coil may take the form of a single winding with lead connections at its ends and with one or more tappings from it at some point or points intermediate its ends. The coil may alternatively take the form of two or more separate parts any one of which can be energized quite independently of the others. It will be appreciated that such a construction can be utilized to operate a single armature by the supply to it of currents of different magnitude, and of course the movement of the armature may be utilized for a variety of purposes. One specific use of the aforesaid magnet coil is in connection with current diverters for electric motors having series-wound field coils, that is to say series motors and compound motors. Another use of the coil is in connection with field-weakening means for electric motors having shunt-wound field coils, that is to say shunt motors and compound motors. The application of the coil to such current diverters and field-weakening means constitute features of the present invention and are uses of the coil for which it is particularly applicable.

In vehicles driven by electric motors as aforesaid, for example railway and tramway vehicles or trolley omnibuses, it is useful, in order to improve the acceleration and top speed of the vehicles, to divert a portion of the current from the field coils or otherwise to weaken the field strength. If this is done by arranging that certain notches in the driver's controller make the necessary shunting or other connections, the driver will be able to run the vehicle with the current so diverted or varied in conditions which are quite unsuitable for the motors to be so operating. For example, the driver might move his controller into the notch which diverts the current or otherwise weakens the field at a time when the vehicle was running up a hill with a heavy load. This naturally would cause serious sparking and overheating and possibly also serious damage to the motors. If, therefore, the power to facilitate acceleration and to increase the top speed of the vehicle is to be given to the driver with safety it is necessary to ensure that he shall not be placed in a position to utilize this power when the conditions are such that it is dangerous for him to do so.

There are two sets of circumstances for which accommodation is required. In the first place, there may be, before the current diversion or variation takes place, a current of such an amount passing through the motor that the switching in of the current diverter or other field-varying means would automatically increase this current to a dangerous point. For instance, if the danger point is 55 amperes, the known effect of the switching in of the field-varying means might be such that it would be dangerous to permit it to be switched in if the current passing at the time were 40 amperes. If, however, the current passing is below 40 amperes then there will be no objection to the field-varying means being brought into operation. There must, however, be the additional safe-guard of means for preventing the field-varying means from remaining in operation if subsequently the current reaches 55 amperes, this being the second set of circumstances, above mentioned, for which accommodation is required. Thus, it is one feature of the present invention to provide in an electric motor, the combination with a device for varying the ratio of the current passing through the motor armature to that passing through the field, by weakening the latter, of a magnet coil, as aforesaid, which controls the said field-weakening device through the magnet armature and itself receives the motor current. The invention also includes the provision of a regulating device operated by the motor current and so constructed and operatively connected to the field-varying means as automatically to prevent the latter from being brought into operation to weaken the field if a current of greater than a predetermined magnitude is passing through the motor, and automatically to prevent the field-varying means from remaining in field-weakening operation if a current of greater than another predetermined magnitude is passing through the motor. Preferably, also the field-varying means are automatically prevented from recommencing field-weakening operation, after having been cut out under the second condition mentioned in the preceding sentence, until the current through the motor has fallen at least to the magnitude required under the first condition specified in the preceding sentence. Thus, the field-varying means will not be automatically brought back into operation again owing to the reduction in motor current caused by the increase in the field strength, but they can be automatically brought into operation again when the motor current has decreased to the specified extent assuming that the driver's controller is still appropriately set.

In applying the magnet coil aforesaid to the control of a current diverter for the series-wound coil of a series or compound motor, as above described, it will be convenient to arrange that the current at the condition (a) aforesaid is that current which if passing through the motor at normal field strength would be automatically increased to the danger point if the diverter were brought into operation, and the current at the condition (b) aforesaid includes the current which is diverted when the field is weakened. The armature of the magnet coil will then so control the diverter as to render it impossible for the driver to run the vehicle with the diverter in operation at unsafe current flow. Similarly in applying a two-part coil to the control of field-weakening means for the shunt-wound coil of a shunt or compound motor, the currents at the said condition (a) may be as regards the one coil part the current through the motor armature, and as regards the other coil part the whole or a portion of the current through the shunt-wound coil of the motor and the current at the said condition (b) may be the current through the motor armature.

In some circumstances it may be desirable to provide an electric motor with more than one of the aforesaid field-weakening devices, they being of different operative effect, and it may be left optional to the driver to choose which of these devices he will bring into operation, subject of course to the automatic control hereinbefore described. Alternatively, however, an automatic selection of the field-weakening devices may be made. In this relation it is a feature of the invention to provide an electric motor with a plurality of units each consisting of one of the said field-weakening devices and one of the said magnet coils controlling it, the operative effect of the field-weakening devices, and the current required to operate their controlling magnet coils, in different units being correspondingly different, and electrical connections between individual units and between the latter and the motor armature, whereby the field-weakening devices are automatically brought into and out of operation successively and appropriately according to variations in the current through the motor armature. Thus there would be an automatic and progressive lessening of the amount of field-weakening possible according to the amounts of current which are liable to cause sparking or overload in the various running conditions. A suitable specific arrangement in accordance with this feature of the invention is one in which the electrical connections are such that one of the said units when operative controls a switch which renders a second unit operable when the current appropriate to the latter is passed through its coil, but which second unit would not be operable if the said switch were not so controlled.

For a more complete understanding of the invention there will now be described, by way of example only and with reference to the accompanying drawings, certain applications of the invention to electric tramcars adapted to be driven in either direction and to be controlled from either end. It is to be understood, however, that the invention is not limited to the precise details set forth.

In these drawings:—

Figures 1 and 2 together illustrate the wiring for a vehicle, as aforesaid, having two series-wound motors which can be coupled either in series or in parallel, and having a single field-weakening device for each motor, controlled by a two-part magnet coil. It will be understood that Figures 1 and 2 are to be regarded as continuations the one of the other and are to be read together.

Figure 3 is a diagrammatic illustration of the motors of Figures 1 and 2 when coupled in series;

Figure 4 is a view corresponding to Figure 3 but showing the motors coupled in parallel;

Figure 5 is a view similar to Figures 3 and 4 but illustrating the operation of the field-weakening devices and the controlling coil;

Figure 6 is a view showing part of the wiring for an arrangement in which a single field-weakening device and a two-part controlling magnet coil therefor are applied to a shunt motor;

Figures 7 and 8 are diagrams corresponding to Figures 1 and 2 but showing two field-weakening devices applied to each of the vehicle motors, one of such devices being controlled by a three-part magnet coil. As with Figures 1 and 2, Figures 7 and 8 are intended to be read in conjunction with each other.

Figure 9 is a diagrammatic illustration of the motors of Figures 7 and 8 when coupled in series;

Figure 10 is a view corresponding to Figure 9 but showing the motors coupled in parallel;

Figure 11 is a view similar to Figures 9 and 10 but illustrating the operation of the field-weakening devices and their controlling coils, and Figure 12 is a diagrammatic illustration of the motors of Figures 7 and 8 when coupled in braking conditions.

Like reference numerals indicate like parts throughout the drawings.

Referring firstly to Figures 1-5, the armature of one motor is indicated at 10 and its corresponding field winding at 11, and the armature of the other motor at 12 and its field winding at 13. The master controller for one end of the car is indicated generally at 14, and the corresponding controller at the other end of the car at 15. Each of these controllers includes a number of contact fingers 16 and contacts 17 which are appropriately wired. The reversing barrel contact fingers and contacts are indicated generally for one end of the car at 18 and for the other end of the car at 19 and blow-out coils are shown at 20 and 21. A starting and braking resistance is shown at 22, and cut-out devices for the motor 10, 11 at 23, 24 and those for the motor 12, 13 at 25, 26. The foregoing parts are in common use in electrically-driven vehicles and it will be understood that they can be of diverse constructions and arrangements according to circumstances. One suitable arrangement of the wiring has been illustrated but as this does not constitute part of the present invention it will not be described in detail and it is to be understood that it can be varied according to requirements.

As already mentioned, the arrangement illustrated in Figures 1-5 is applicable to a vehicle having two series-wound motors which can be coupled either in series, as shown in Figure 3, or in parallel, as shown in Figure 4. A notch for the driver's controller is also provided, immediately after those which bring the motors into parallel, which notch while leaving the motors in parallel, also permits the current diverters to be brought into operation. This will be clear from Figure 5.

Referring now more particularly to Figures 1 and 5, the current diverters themselves, one for each motor, are shown at 27 and 127, the former being appropriated to the motor 10, 11 and the latter to the motor 12, 13. The current diverters may each take the form of an ordinary resistance, and the diverter 27 is connected by a lead 28 to the field winding 11 while the diverter 127 is connected by a lead 128 to the field winding 13. At 29 and 30 there are shown the two poles of a double-pole clapper switch or contactor which is connected by a lead 31 to a tapping 32 from a magnet coil 33. By the tapping 32 the coil 33 is divided into two parts. The coil 33 is connected at one end by a lead 34 to the controllers 14 and 15 and by them can be placed in series with the motor armatures 10 and 12. The contact point 35 which co-operates with the pole 29 is connected by a lead 36 with the diverter 127 and the contact point 37 which co-operates with the pole 30 is connected by a lead 38 with the diverter 27. In this way the diverters 27 and 127 can each be brought into parallel with their respective field windings. The switch 29, 30 is gravity- or spring-controlled so as to tend normally to open, but it may be maintained closed by the operation of a higher resistance coil 39 through which full line current or current from some other source is passed. The circuit for the coil 39 however includes a switch 40 which can be opened by the magnet coil 33.

It will be seen that one end of the coil 39 is connected by a lead 41 to a contact 42 for the switch 40. The other end of the coil 39 is connected by a lead 43 to earth at 44. One end of the coil 33 is also connected to earth at 44.

From the foregoing it will be seen that by choosing a suitable strength for the whole of the coil 33, and a suitable position for the tapping 32 from it, it will be ensured that this coil will open the switch 40 and thereby permit the switch 29, 30 to open or remain open whenever the danger point is reached or would be reached if the diverters 27 and 127 were brought into operation. That is to say before the diverters are brought into operation the armature currents of both motors will be flowing through the whole of the coil 33, but when the diverters are in operation, a smaller current (namely only the field currents) will be passing through the whole of this coil while a further current (namely the diverted current) will be passing through that portion which is between the tapping 32 and the earth 44. If 55 amperes be taken as maximum amount of armature current per motor which may be carried without danger when the field is weakened by the operation of the diverters 27 and 127, and that the current will rise automatically to this figure upon the field being weakened if the armature current per motor before the weakening occurs is 40 amperes, then the switch 40 will be so set that a combined current of 40 amperes per motor in the coil 33, as mentioned above, will move the switch into circuit-opening position. When this has occurred, even if the driver brings his controlling handle into the field-weakening notch, the field will not be weakened since no line current will be supplied to the coil 39. In other words, the driver will be automatically prevented from weakening the field at a dangerous time. When, however, the current in each motor armature falls below 40 amperes the field can be weakened safely, and if the driver brings his controlling handle into position to effect this, line current will pass through the coil 39 because the switch 40 will be closed. As the vehicle proceeds, however, with the diverters in operation, the current through the motor armatures may rise, say because the vehicle is proceeding up an incline, and when it reaches 55 amperes through each armature, the combined effects of the currents through the coil 33, as mentioned above, will open the switch 40 and de-energize the coil 39 thereby permitting the switch 29, 30 to open and consequently cutting out the diverters.

The magnet coil 33 in the arrangement described above is one continuous winding and its parts, although they can be operatively divided in one sense by the tapping 32, are always in direct electrical communication with each other. This arrangement of the coil, however, can be varied. For example, in applying automatically controlled field-weakening means to a shunt-wound motor, see Figure 6, the magnet coil may comprise two separate and distinct windings 45 and 46 which are not in direct electrical communication with each other. They are, however, wound on a single core or otherwise so arranged as to control a single switch. The coil part 46 is connected in series with the motor armature 47 by a lead 48 and is connected at the other end to earth 44 or to the negative pole of the supply if a double-pole circuit is employed. The coil part 45 is connected at one end by a lead 49 to the positive end of the field winding 50 of the motor and at the other end by a lead 51 to the contact point 52 of a switch 53 which tends automatically to open. The switch 53, however, is controlled and can be closed by a coil 54 through which full line current may be passed. One end of the coil 54 is coupled to a junction point 55 from which extend two leads 56 and 57. The former extends to a switch contact 58 and the latter to the switch contact 42. Co-operating with the contact 58 is a switch 59 connected to receive line current by a lead 60 and also connected by a lead 61 to a field-weakening resistance 62 and to the switch 53. The field-weakening resistance 62 is connected to the field winding 50 by a lead 63. The switch 59 is a field-weakening control switch which is hand-operated and is interlocked with the motor starter (not shown) so as to ensure that the field shall not be weakened when starting up. It will be appreciated that the coil 54 can be supplied with line current either directly through the lead 60 and the switch 59 when the latter is closed or through the switch 40 and the lead 57 if the latter switch is closed. As already indicated in connection with Figures 1–5, the switch 40 tends to move into open position but can be closed by the two-part magnet coil (45, 46 in Figure 6) which controls it.

This arrangement may operate as follows. If the switch 59 is closed, line current will be supplied to the coil 54 thereby closing the switch 53 and short-circuiting the field-weakening resistance 62 with the result that the main portion of the field current passes through the coil part 45. The armature current will be passing through the other coil part 46. If, as before, 55 amperes be taken as the maximum amount of armature current which can be carried without danger when the field is weakened, and that the current will rise automatically to this figure upon the field being weakened if the armature current before the weakening occurs is 40 amperes, then the switch 40 will be so set that the combined effects of the currents in the two coil parts 45 and 46 will move the armature into circuit-closing position if the current through the coil part 46 exceeds 40 amperes. When this has occurred, even if the driver opens the switch 59, the field will not be weakened since line current will continue to be supplied to the coil 54 so that the driver will be automatically prevented from weakening the field at a dangerous time. When, however, the current in the armature 47 falls below 40 amperes, the field can be weakened safely and if the driver opens the switch 59 for this purpose, no line current will pass through the coil 54 because the switch 40 will be opened. No current will be passing through the coil part 45 and less than 55 amperes through the coil part 46. As the vehicle proceeds, however, the current through the armature 47 may rise, and when it reaches 55 amperes the coil part 46 will exert sufficient power to close the switch 40 and thus supply line current to the coil 54 and close the switch 53. The field-weakening resistance 62 will then be automatically short-circuited again.

Referring now to the arrangement illustrated in Figures 7-12, provision is therein made for the field-weakening to be varied, instead of, as in the arrangements shown in Figures 1-6, only one degree of field-weakening being provided for. The general arrangement of the connections of the driver's controllers to the motors and the field-weakening means is substantially the same as has already been described in connection with Figures 1-5, but an additional contact is shown in chain-lines in Figure 7 at 64 which may be used if field-weakening is required when the motors are coupled together in series. An additional contact finger is also shown at 65 which could be employed if the driver is provided with two field-weakening notches of different values between which he could choose at will. It will be appreciated, however, that where field-weakening devices of different values are provided it is preferable in some circumstances that the choice should be made automatically according as to which of them can most suitably be brought into operation, and Figures 7 and 11 illustrate one way of doing this. Two field-weakening devices indicated generally at 66 and 67 are shown and the arrangement is such that either only the device 66 or both of the devices 66 and 67 are in operation when field-weakening is permissible. In other words, sometimes it is possible for the full effect of both the devices 66 and 67 to be utilized while at other times it is only safe to utilize the device 66. Of course at other times both of the devices will be out of operation.

The chosen conditions may be such that the danger current for each motor with device 66 in operation is 55 amperes and the figure to which the motor current will rise is 50 amperes if device 66 is brought into operation when each motor is carrying 35 amperes unshunted; further that the danger current for each motor with device 67 in operation is 45 amperes and the figure to which the motor current will rise is 40 amperes if device 67 is brought into operation when each motor is carrying either 20 amperes unshunted or 30 amperes with the device 66 in operation; an arrangement conforming with these conditions will now be described.

The field-weakening device 66 comprises a magnet coil 33 with a tapping 32 leading to a contact 68 of a double-pole switch 69. 70 which is normally open but can be closed by energizing the coil 39. One end of the coil 33 is connected by a lead 71 to the master controller and the other end is connected by a lead 72 to one end of the field winding 11. The switch pole 69 is connected by a lead 73 to a current diverter 74 for the motor 10, 11 and the pole 70 is connected by a lead 75 to a diverter 76 for the motor 12, 13. One end of the coil 39 is connected to earth at 77 and the other end is connected by a lead 78 to a switch 79 in the field-weakening device 67. The switch 79 is controlled by a magnet coil 80, while in the field-weakening device 66 the magnet coil 33 correspondingly controls a switch 81 which is connected by a lead 82 to the master controller. The lead 78 includes a contact 83 co-operating with the switch 81. The pole 70 is provided with a co-operating contact 84 which is connected by a lead 85 with a tapping 86 from the magnet coil 80 in the field-weakening device 67 aforesaid.

The field-weakening device 67 comprises the magnet coil 80, already described, which has two tappings from it, namely 86 (already referred to) and 87. This coil 80, therefore, is really a three-part coil. The connection for the tapping 86 has already been described. The tapping 87 is connected by a lead 88 to one contact 89 for a double-pole switch 90, 91 which is normally open but can be closed by energizing a coil 92. One end of the coil 80 is connected by a lead 93 to earth at 94 and the other end is connected by a lead 95 to one end of the field-winding 13. The switch pole 91 which co-operates with the contact 89 is connected by a lead 96 to the current diverter 76 for the motor 12, 13 and the pole 90 is connected by a lead 97 to the diverter 74 for the motor 10, 11. One end of the coil 92 is connected to earth at 98 and the other end is connected by a lead 99 to a contact 100 co-operating with the switch 79 aforesaid. The pole 90 is provided with a co-operating contact 101 which is connected by a lead 102 to the master controller. The current diverter 74 is connected by a lead 103 to one end of the field winding 11 and the diverter 76 is connected by a lead 104 to one end of the field winding 13.

The operation of the arrangement shown in Figures 7–12 may be described as follows. So far as ordinary series, parallel, and braking connections are concerned, the connections effected by the master controller will be as illustrated in Figures 9, 10 and 12 respectively and need not be further described.

As regards the field-weakening devices, their operation is more particularly illustrated in Figures 7 and 11. The two-part magnet coil 33 carries the current of one motor and is set so that the switch 81 will open if the current passing through the coil 33 exceeds 35 amperes when the switch 69, 70 is open. When the switch 69, 70 is closed, however, the whole length of the coil 33 carries the current of one motor field while the tapped portion (i. e., the portion between the tapping 32 and the lead 71) of the coil carries also the diverted current. The tapping 32 is arranged in such a position that the switch 81 in these conditions will open when the total current per motor reaches 55 amperes. The three-part magnet coil 80 also carries the current of one motor and is set so that the switch 79 will open if the current in the coil 80 exceeds 20 amperes with the switches 69, 70 and 90, 91 open. When the switch 69, 70 is closed but the switch 90, 91 is open the coil 80 carries the current of one motor field while the diverted current passes through that portion of the coil lying between the tapping 86 and the lead 93. The tapping 86 is in such a position that the switch 79 will open when, in these conditions, the total current per motor reaches 30 amperes. With the switches 69, 70 and 90, 91 both closed, the coil 80 carries the current of one motor field and also the larger part of the diverted current through that portion of its length which lies between the tapping 87 and the lead 93. There will also be some current passing through the coil between the tapping 86 and the lead 93. The tapping 87 is in such a position that, in these conditions, the switch 79 will open when the total current per motor reaches 45 amperes.

When the driver moves his controller into the field-weakening notch, if the current in each motor does not exceed 20 amperes, the field-weakening device 66 will operate, followed immediately afterwards by the field-weakening device 67. If now the current per motor, whilst running with both of the devices 66 and 67 in operation, rises to 45 amperes, the switch 79 will be automatically opened, leaving the vehicle running with only the device 66 in operation. If subsequently the current per motor decreases to less than 30 amperes, the device 67 will come into operation again. When the vehicle is running with only the device 66 in operation, if the current per motor increases to 55 amperes, the switch 81 will open. The vehicle will then run without either of the field-weakening devices in operation until the current per motor decreases to less than 35 amperes. When this occurs the switch 81 closes again and brings the device 66 into operation, while when the current has further decreased to less than 30 amperes the switch 79 will close and bring the device 67 into operation. If at the time that the driver moves his controller into the field-weakening notch the current per motor exceeds 20 amperes but does not exceed 35 amperes, the device 66 would operate, but the field-weakening device 67 would not operate until the current had fallen sufficiently. Similarly, if at the time that the driver reaches the field-weakening notch, the current per motor exceeds 35 amperes, neither of the devices 66, 67 would come into operation, but they would come into operation later as the current fell.

It will be seen that the device according to the present invention will not prevent the driver from regulating the speed of the vehicle under all safe conditions, and the rheostatic or magnetic braking notches of the controller are quite unaffected. The invention is applicable to controllers using an earth return or a double-pole circuit and may be applied to existing equipments with but little trouble and alteration.

It is to be understood that the invention is not limited to the precise details hereinbefore set forth, nor to use in conjunction with electrically driven vehicles as it is also applicable to stationary machines, motors for shop machinery and other installations.

I claim:—

1. In electric current-operated controlling mechanism, the combination with the source of current, of a magnet coil comprising a plurality of coil parts, an armature for said coil, a separate current-supply lead to each coil part, and means connecting said leads to the source of current and so arranged that the magnet coil is automatically energized to operate its armature either when—(*a*) a current or currents of predetermined magnitude passes through a plurality of the coil parts, or when (*b*) a current of lower magnitude passes through a plurality of the coil parts and an additional current passes through a smaller number of coil parts only.

2. An electric motor control system, comprising the combination with the electric motor of a device for varying the ratio of the current passing through the motor armature to that passing through the field circuit, by weakening the latter, a magnet coil receiving the motor current and comprising a plurality of coil parts, an armature for said coil, operative connections between the coil armature and the field-weakening device whereby the latter is controlled by the said coil armature, and means comprising a current-supply lead to each coil part and so arranged that currents of different magnitude, by being passed through different lengths of the coil, can have the same operative effect upon the coil armature.

3. An electric motor control system, comprising the combination with the electric motor of a device for varying the ratio of the current passing through the motor armature to that passing through the field circuit, by weakening the latter, a magnet coil receiving the motor current and comprising a plurality of coil parts, an armature for said coil, operative connections between the coil armature and the field-weakening device whereby the latter is controlled by the said coil armature, and means comprising a current-supply lead to each coil part and so arranged that the coil is automatically energized to operate its armature either when (a) a current or currents of predetermined magnitude passes through a plurality of the coil parts, or when (b) a current of predetermined higher magnitude passes through a smaller number of coil parts.

4. A control system for an electric motor which has a series wound coil, comprising the combination with the electric motor of a current-diverter for the series wound coil of the motor, a magnet coil receiving the motor current and comprising a plurality of coil parts, an armature for said coil, operative connections between the coil armature and the diverter whereby the latter is controlled by the said coil armature, and means comprising a current-supply lead to each coil part and so arranged that the magnet coil is automatically energized to operate its armature either when (a) a current or currents of predetermined magnitude passes through a plurality of the coil parts, or when (b) a current of predetermined higher magnitude passes through a smaller number of coil parts, the current at the said condition (a) being that current which if passing through the motor at normal field strength would be automatically increased to the danger point if the diverter were brought into operation, and the current at the said condition (b) including the current which is diverted when the field is weakened.

5. A control system for an electric motor which has a series wound coil, comprising the combination with the electric motor of a current-diverter for the series wound coil of the motor, a magnet coil receiving the motor current and comprising a plurality of coil parts, an armature for said coil, operative connections between the coil armature and the diverter whereby the latter is controlled by the said coil armature, and means comprising a current-supply lead to each coil part and so arranged that the magnet coil is automatically energized to operate its armature either when (a) a current or currents of predetermined magnitude passes through a plurality of the coil parts, or when (b) a current of lower magnitude passes through a plurality of the coil parts and an additional current passes through a smaller number of coil parts only, the current at the said condition (a) being that current which if passing through the motor at normal field strength would be automatically increased to the danger point if the diverter were brought into operation, and the current at the said condition (b) including the current which is diverted when the field is weakened.

6. An electric motor control system, comprising the combination with the electric motor of a plurality of units, each unit including a device for varying the ratio of the current passing through the motor armature to that passing through the field, by weakening the latter, a magnet coil receiving the motor current and comprising a plurality of coil parts, an armature for said coil, operative connections between the coil armature and the field-weakening device whereby the latter is controlled by the said coil armature, and means comprising a current-supply lead to each coil part and so arranged that currents of different magnitude, by being passed through different lengths of the coil, can have the same operative effect upon the coil armature, the operative effect of the field-weakening devices, and the current required to operate their controlling magnet coils, in different units being correspondingly different, and electrical connections between the individual units, and between the latter and the motor armature, whereby the field-weakening devices are automatically brought into and out of operation successively and appropriately according to variations in the current through the motor armature.

7. An electric motor control system, comprising the combination with the electric motor of a plurality of units, each unit including a device for varying the ratio of the current passing through the motor armature to that passing through the field, by weakening the latter, a magnet coil receiving the motor current and comprising a plurality of coil parts, an armature for said coil, operative connections between the coil armature and the field-weakening device whereby the latter is controlled by the said coil armature, and means comprising a current-supply lead to each coil part and so arranged that the magnet coil is automatically energized to operate its armature either when (a) a current or currents of predetermined magnitude passes through a plurality of the coil parts, or when (b) a current of predetermined higher magnitude passes through a smaller number of coil parts, the operative effect of the field-weakening devices, and the current required to operate their controlling magnet coils, in different units being correspondingly different, and electrical connections between the individual units, and between the latter and the motor armature, whereby the field-weakening devices are automatically brought into and out of operation successively and appropriately according to variations in the current through the motor armature.

8. An electric motor control system, comprising the combination with the electric motor of two units, each unit including a device for varying the ratio of the current passing through the motor armature to that passing through the field, by weakening the latter, a magnet coil receiving the motor current and comprising a plurality of coil parts, an armature for said coil, operative connections between the coil armature and the field-weakening device whereby the latter is controlled by the said coil armature, and means comprising a current-supply lead to each coil part and so arranged that currents of different magnitude, by being passed through different lengths of the coil, can have the same operative effect upon the same coil armature, the operative effect of the field-weakening devices, and the current required to operate their controlling magnet coils in the two different units being correspondingly different, a switch controlling the operation of one of the units, means for operating said switch from the other unit, and electrical connections between the units and the motor armature, whereby the field-weakening devices are automatically brought into and out of operation successively and appropriately according to variations in the current through the motor armature, the said switch-controlled unit not becoming operative until the switch-controlling unit has become operative and has manipulated the switch.

9. An electric motor control system, comprising the combination with the electric motor of field-varying means, a regulating device, and electrical means for operatively connecting the regulating device to the field-varying means and for supplying motor current to the regulating device, so arranged that (a) The regulating device automatically prevents the field-varying means from being brought into operation to weaken the field if a current of greater than a predetermined magnitude is passing through the motor, and (b) the regulating device automatically prevents the field-varying means from remaining in field-weakening operation if a current of greater than another predetermined magnitude is passing through the motor.

10. An electric motor control system, comprising the combination with the electric motor of field-varying means, a regulating device, and electrical means for operatively connecting the regulating device to the field-varying means and for supplying motor current to the regulating device, so arranged that (a) the regulating device automatically prevents the field-varying means from being brought into operation to weaken the field if a current of greater than a predetermined magnitude is passing through the motor, (b) the regulating device automatically prevents the field-varying means from remaining in field-weakening operation if a current of greater than another predetermined magnitude is passing through the motor, and (c) the regulating device automatically prevents the field-varying means from re-commencing field-weakening operation, after having been cut out under the said condition (b), until the current through the motor has fallen at least to the magnitude required under the said condition (a).

11. An electric motor control system, comprising the combination with the electric motor of field-varying means, a magnet coil receiving the motor current and comprising a plurality of coil parts, an armature for said coil, operative connections between the coil armature and the field-varying means whereby the latter is controlled by the said coil armature, and means comprising a current-supply lead to each coil part and so arranged that currents of different magnitude, by being passed through different lengths of the coil, can cause the coil armature to (a) prevent the field-varying means from being brought into operation to weaken the field if a current of greater than a predetermined magnitude is passing through the motor, and (b) prevent the field-varying means from remaining in field-weakening operation if a current of greater than another predetermined magnitude is passing through the motor.

12. An electric motor control system, comprising the combination with the electric motor of field-varying means, a magnet coil receiving the motor current and comprising a plurality of coil parts, an armature for said coil, operative connections between the coil armature and the field-varying means whereby the latter is controlled by the said coil armature, and means comprising a current-supply lead to each coil part and so arranged that currents of different magnitude, by being passed through different lengths of the coil, can cause the coil armature to (a) prevent the field-varying means from being brought into operation to weaken the field if a current of greater than a predetermined magnitude is passing through the motor, (b) prevent the field-varying means from remaining in field-weakening operation if a current of greater than another predetermined magnitude is passing through the motor, and (c) prevent the field-varying means from recommencing field-weakening operation, after having been cut out under the said condition (b), until the current through the motor has fallen at least to the magnitude required under the said condition (a).

13. An electric motor control system, comprising the combination with the electric motor of field-varying means, a magnet coil receiving the motor current and comprising a plurality of coil parts, an armature for said coil, operative connections between the coil armature and the field-varying means whereby the latter is controlled by the said coil armature, and means comprising a current-supply lead to each coil part and so arranged that when (a) a current or currents of predetermined magnitude passes through a plurality of the coil parts, or when (b) a current of lower magnitude passes through a plurality of coil parts and an additional current passes through a smaller number of coil parts only, the coil armature prevents the field-varying means from being brought into operation to weaken the field or prevents the field-varying means from remaining in field-weakening operation as the case may be.

In testimony whereof I affix my signature.

LESLIE BARNETT HEWITT.